June 29, 1965 V. E. HILDEBRAND 3,192,526
WAVE-SIGNAL DIRECTION-DETECTING APPARATUS
Filed Jan. 7, 1963

VERNE E. HILDEBRAND
INVENTOR.

BY *T. M. Phillips*
*J. M. St. Amand*

ATTORNEYS

United States Patent Office 3,192,526
Patented June 29, 1965

3,192,526
WAVE-SIGNAL DIRECTION-DETECTING APPARATUS
Verne E. Hildebrand, Riverside, Calif., assignor to the United States of America as represented by the Secretary of the Navy
Filed Jan. 7, 1963, Ser. No. 249,960
5 Claims. (Cl. 343—113)
(Granted under Title 35, U.S. Code (1952), sec. 266)

The invention herein described may be manufactured and used by or for the Government of the United States of America for governmental purposes without the payment of any royalties thereon or therefor.

The present invention relates to a wave-signal direction-detecting apparatus which can receive signals arriving from all directions, but visibly displays signals received from only one direction.

The present invention employs a first receiving antenna arrangement which includes a pair of loop antenna in quadrature and a sense antenna. The signal received at each loop is amplified, filtered, and passed to the vertical and horizontal control plates respectively of a cathode ray tube. The sense antenna receives the same signal which is amplified, filtered, and fed to the cathode accelerator of the cathode ray tube to indicate signal strength. A mask with a narrow wedge removed is positioned on the face of the cathode ray tube so that the open portion is in the coordinate position on the face of the tube that represents the direction from which the detection of VLF energy is being attempted. A photoelectric cell positioned to sense a signal on the cathode ray tube screen will see only signals in the wedge which represents signals received from a direction to cause the cathode beam to deflect to that position on the screen. The output signal from the photoelectric cell operates a gate which is connected to a second receiving antenna that receives the same signals as the first receiving antenna arrangement. When a signal is received from the photoelectric cell, the gate opens and passes the signal being received at the second antenna.

Other objects and many of the attendant advantages of this invention will become readily appreciated as the same becomes better understood by reference to the following detailed description when considered in connection with the accompanying drawings wherein.

Figure 1:
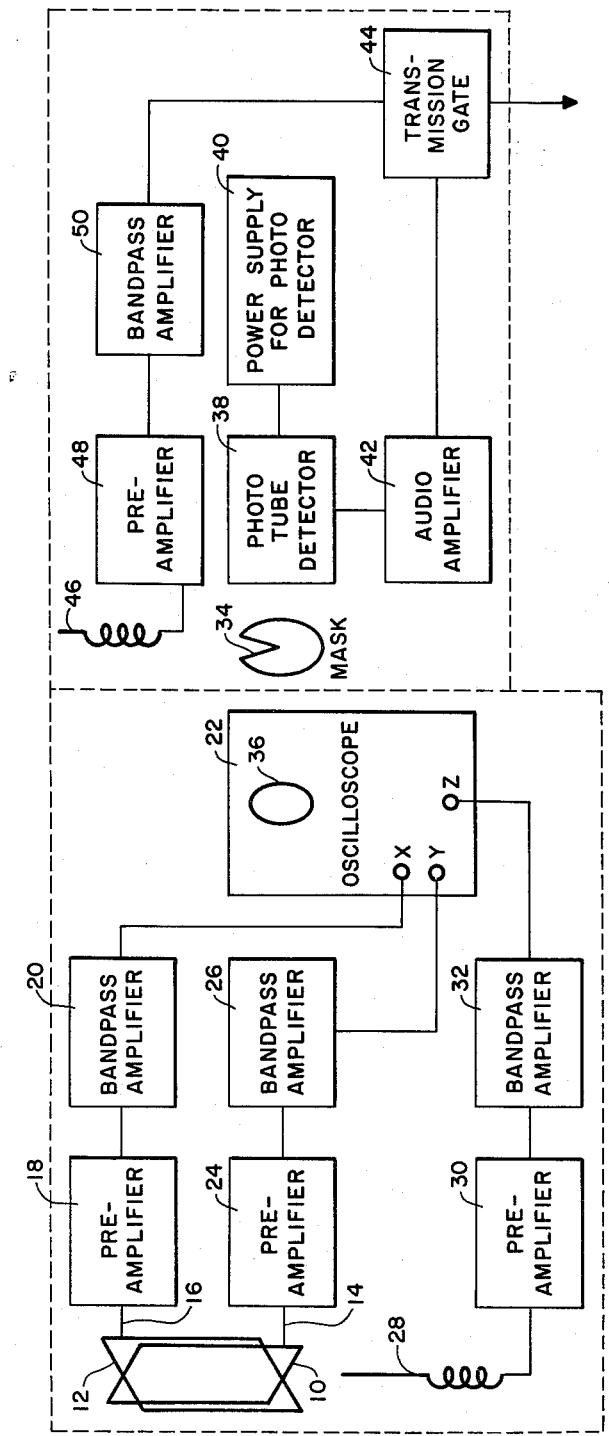
FIG. 1 is a block diagram of a preferred embodiment of the invention.

Referring now to FIG. 1, there is shown a VLF direction finding apparatus embodying the present invention. Two loop antennas 10 and 12, displayed from each other in azimuth by 90 degrees so as to receive signals with amplitudes proportional to the sine and cosine of angle $\theta$, where $\theta$ is the azimuth angle with respect to the axis of one of the loops, are coupled to separate channels via leads 14 and 16, respectively. The channel associated with loop 12 includes pre-amplifier 18, bandpass amplifier 20 and provides an input to the X coordinate input of oscilloscope 22; while the channel associated with loop 10 includes pre-amplifier 24, bandpass amplifier 26 and provides an input to the Y coordinate input of oscilloscope 22. A third or sense channel includes vertical antenna 28, pre-amplifier 30, bandpass amplifier 32 and provides a signal to the cathode accelerator of oscilloscope 22. A mask 34 with a narrow wedge removed is attached to the cathode ray tube face 36; a photo tube detector 38 is placed to sense a signal on the face of tube 36. Photo tube detector is provided with a power supply 40 and is connected to audio amplifier 42 which provides an output control signal for transmission gate 44 which may be of the type shown and described in U.S. patent application of Raymond W. LaBahn, Serial No. 226,783, filed September 25, 1962 for transmission or blocking gate. Coupled to gate 44 is an antenna circuit including vertical antenna 46, pre-amplifier 48 and bandpass amplifier 50.

In operation, an electromagnetic signal received from a given direction, depending on the direction of arrival and magnitude of the signal, is indicated on the face of tube 36 by a deflection of the spot. Mask 34 is placed against the face of tube 36 and blocks all light emitting from the tube except that passing through the wedge shaped cut-out. Since the deflection of the spot on the face of tube 36 indicates the direction from which a signal is being received, mask 34 is adjusted to a position which will allow light to pass through mask 34 when the desired signal is incident on the antennas 10 and 12. The light passing through mask 34 is detected by photo tube detector 38 and generates an output signal which is amplified and provides a control signal for gate 44. The presence of a control pulse will open gate 44 and pass the received signal at antenna 46. Thus, signals received at antenna 46 will be permitted to pass only when signals are received at 12 that correspond to the position of the opening in mask 34.

Figure 3:
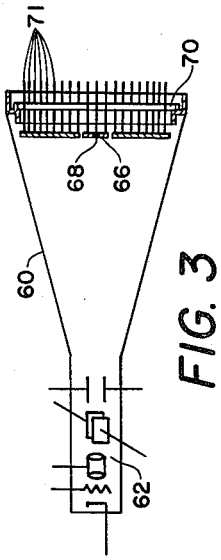
FIG. 3 shows a cross section of the tube of FIG. 3.
Figure 2:
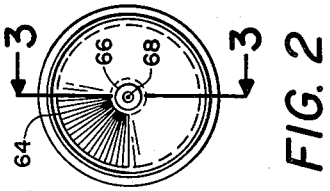
FIG. 2 shows a modification of the cathode ray tube used in the oscilloscope of FIG. 1.

Cathode ray tube 36, mask 34 and photo tube detector 38 with its power supply 40 may be replaced with the cathode ray tube shown in FIGS. 2 and 3. Referring to FIGS. 2 and 3, there is shown a standard CRT envelope 60 and standard CRT gun structure 62. The face of the tube where normally a phosphorous coating is placed for visual viewing is replaced by target structure consisting of 60 wedge-shaped plates 64. Each of the 60 wedges has an angular dimension of six degrees, minus a small amount for providing spacing in between wedges 64. A doughnut shaped member 66 is mounted in the center and a space is provided between member 66 and the points of wedges 64. The doughnut shaped member 66 is to provide coarse centering of the electron beam and a center pin 68 is provided for fine centering adjustment.

The main purposes of this tube is to determine the angle at which the electron beam is deflected originally outward from center. This deflection is detected by the wedge-shaped plate over which the beam passes. The signal generated is brought out through face 70 of tube 60 by pins 71 connected to plates 64.

Obviously many modifications and variations of the present invention are possible in the light of the above teachings. It is therefore to be understood that within the scope of the appended claims the invention may be practiced otherwise than as specifically described.

What is claimed is:

1. A wave-signal direction-detecting apparatus comprising:
   (a) first receiving antenna means for generating signals proportional to the direction and magnitude of received VLF electromagnetic signals,
   (b) second receiving antenna means for receiving the same signals as the first antenna means,
   (c) oscilloscope presentation means connected to said receiving antenna means for indicating on the face of the cathode ray tube by a deflection of the spot thereon in response to said received electromagnetic signals,
   (d) a mask having a wedge shaped cut out and being associated with the face of said oscilloscope for permitting light from said deflected spot to pass through said cut out when the desired signal is incident on said receiving antenna means from a predetermined direction, (e) photo detecting means for generating an output signal in response to light being emitted through the cut out of said mask, (f) and circuit means coupled to said photo detecting means and to said second antenna means and being responsive to the output signal from said photo detecting means to pass a signal received from the second antenna means.

2. A wave-signal direction-detecting apparatus comprising:

(a) first receiving antenna means for generating signals proportional to the direction and magnitude of received VLF electromagnetic signals, (b) second receiving antenna means for receiving the same signals as the first antenna means, (c) signal direction sensing circuit means coupled to said first antenna means for generating an output signal when a signal is incident on said receiving antenna means from a predetermined direction, and (d) circuit means coupled to said signal sensing means and to said second antenna means and being responsive to the output signal from said signal sensing means to pass a signal received from the second antenna means.

3. The apparatus of claim 2 wherein said signal direction sensing circuit means comprises:

(a) oscilloscope presentation means connected to said first receiving antenna means for indicating relative direction on the face of the cathode ray tube by a deflection of the spot thereon in response to said received electromagnetic signals, (b) a mask having a wedge shaped cut out and being associated with the face of said oscilloscope for permitting light from said deflected spot to pass through said cut out when a signal is incident on said first receiving antenna means from a predetermined direction, and (c) photo detecting means for generating an output signal in response to light being emitted through the cut out of said mask.

4. The apparatus of claim 2 wherein said signal direction sensing circuit means comprises a cathode ray tube having a plurality of target plates insulated from each other spaced radially from the center path of the electron beam of said cathode ray tube, each of said plates having a conductor extending through the face of said cathode ray tube.

5. A wave-signal direction-detecting apparatus comprising:

(a) a VLF direction finding system including an oscilloscope on which the spot is deflected in response to the direction from which electromagnetic signals are received, (b) separate antenna receiving means for receiving the same electromagnetic signals which cause the deflection of the spot on the oscilloscope, (c) a mask having a wedge shaped cut out and being associated with the face of said oscilloscope for permitting light from said deflected spot to pass through said cut out when a signal is received from a predetermined direction, (d) photo detecting means associated with said oscilloscope for producing an output signal in response to light being emitted through the cut out portion of said mask, (e) and circuit means coupled to said photo detecting means and to said separate antenna means and being responsive to the output signal of said photo detecting means to pass a signal received at said separate antenna means.

References Cited by the Examiner
UNITED STATES PATENTS 2,994,872  8/61  Baltzer _____ 343—115 X
3,108,269  10/63  Collis _____ 343—5
3,110,029  11/63  Tyce _____ 343—118

CHESTER L. JUSTUS, *Primary Examiner.*